(12) United States Patent
Park et al.

(10) Patent No.: US 8,258,943 B2
(45) Date of Patent: Sep. 4, 2012

(54) UBIQUITOUS SENSOR NETWORK-BASED SYSTEM AND METHOD FOR AUTOMATICALLY MANAGING FOOD SANITATION

(75) Inventors: Jae Ill Park, Daegu (KR); Jung Gyu Kim, Daegu (KR); Byung Rak Son, Gyeongsan-si (KR)

(73) Assignee: First-Tech Corporation, Gyeongsangbuk-Do (KR)

( * ) Notice: Subject to any disclaimer, the term of this patent is extended or adjusted under 35 U.S.C. 154(b) by 422 days.

(21) Appl. No.: 12/600,020

(22) PCT Filed: May 8, 2008

(86) PCT No.: PCT/KR2008/002585
§ 371 (c)(1),
(2), (4) Date: Nov. 16, 2009

(87) PCT Pub. No.: WO2008/140212
PCT Pub. Date: Nov. 20, 2008

(65) Prior Publication Data
US 2010/0135211 A1    Jun. 3, 2010

(30) Foreign Application Priority Data

May 16, 2007  (KR) .................. 10-2007-0047354
Mar. 20, 2008  (KR) .................. 10-2008-0025664

(51) Int. Cl.
*G08B 1/08*    (2006.01)
(52) U.S. Cl. ............. 340/539.22; 340/539.26; 340/10.1; 340/572.1
(58) Field of Classification Search ............. 340/539.22, 340/539.26, 10.1, 572.1
See application file for complete search history.

(56) References Cited

U.S. PATENT DOCUMENTS 6,721,624 B2 *  4/2004  Ostro ........................... 700/213
6,982,640 B2    1/2006  Lindsay et al.
7,271,719 B2 *  9/2007  Ku et al. .................. 340/539.26

FOREIGN PATENT DOCUMENTS

KR  1020050080409 A    8/2005
KR  1020060104353 A    10/2006

OTHER PUBLICATIONS

International Search Report dated Sep. 29, 2008.

* cited by examiner

*Primary Examiner* — Daryl Pope
(74) *Attorney, Agent, or Firm* — Scully, Scott, Murphy & Presser, P.C.

(57) ABSTRACT

The present invention relates to a ubiquitous sensor network-based system and method for automatically managing food sanitation. The system includes at least one sensor node (100) configured to measure and store sensing information, compare measured values with preset values, and generate a warning message. A sink node (200) mediates between the sensor node and a management server (400) and between the mobile terminal and the management server. A mobile terminal (300) reads food information using an RFID reader or a barcode reader, transmits the food information, measures and stores sensing information, compares the measured values with preset values, and generates a warning message. The management server (400) generates a control command, transmits the control command to the sensor node or the mobile terminal, and notifies a manager of an urgent situation and a location of the kitchen appliance if received data is a warning message.

21 Claims, 7 Drawing Sheets

UBIQUITOUS SENSOR NETWORK-BASED SYSTEM AND METHOD FOR AUTOMATICALLY MANAGING FOOD SANITATION

TECHNICAL FIELD

The present invention relates, in general, to a ubiquitous sensor network-based system and method for automatically managing food sanitation, and, more particularly, to a ubiquitous sensor network-based system and method for automatically managing food sanitation, which automatically collect information about temperature, humidity, pH, etc. using the sensing function and network function of a ubiquitous sensor network, and enable reports, which would otherwise be manually written by a manager, to be automatically drawn up, thus enabling temperature and humidity, to be either directly or remotely set using a sensor node attached to a kitchen appliance based on HACCP rules, and collecting and recording environmental information of the surroundings of a kitchen in real time.

BACKGROUND ART

As well known to those skilled in the art, Paragraph 1 of Section 2 of Hazard Analysis Critical Control Point (HACCP), established according to the mandate of the Enforcement Decree of the Food Sanitation Act, defines HACCP as 'standards to control in priority each process in order to prevent any dangerous or injurious matter from being mixed into food, and to prevent food from being contaminated throughout the entire process of the raw material control, manufacture, process, cooking, and distribution of food'. Further, according to international food standards (Codex) established by the Codex Alimentarius Commission (CAC), which is operated by the Food and Agriculture Organization (FAO) in conjunction with the World Health Organization (WHO), in order to promote the international trading of food and pursue the health preservation of consumers, HACCP is defined as a 'system for identifying, evaluating and controlling hazardous factors important to food safety'. In this way, referring to several definitions of HACCP, HACCP is a prevention-level concept that ensures and guarantees the safety of food products or food items by continuously managing food throughout the entire process, including the manufacture, distribution and consumption of food, rather than a concept that ensures safety through the inspection of final products.

There is a probability that food hazards to human beings exist in the entire process ranging from the step of producing raw materials of foodstuffs to the step of serving consumers with food on the table. The entire process is the field to which HACCP may be applied and is currently being applied, and methods of most efficiently and safely managing hazards have been systemized through the process. Recently, HACCP has been used for all processes, including the manufacture, processing, cooking and distribution of food, in food production and processing companies, facilities for providing meals, large-scale distribution companies, food service chain restaurants, hotel restaurants, etc. In the above large-scale distribution companies, HACCP has been introduced and implemented for food management.

However, the operation methods used by most companies have been mainly performed through manual operations by managers. Since the number of food items and the number of management steps are excessively large, a manager cannot carefully observe the rules of HACCP. Due thereto, there may frequently occur the case where the observation of the rules of HACCP is falsified.

Further, in places in which raw materials are preserved or cooked, such as large-scale restaurants or facilities for providing meals, sanitation is particularly important. In large-scale restaurants or facilities for providing meals, it is currently prescribed that materials be managed on the basis of HACCP rules and that HACCP reports be periodically drawn up. Therefore, at the present time, in large-scale restaurants or facilities for providing meals, managers regularly measure the temperature, humidity, etc. of various types of kitchen appliances or warehouses for storing materials, record the measured data in the form of reports, and then draw up HACCP reports, but the actual number of mangers is insufficient, and it is very inconvenient to manually draw up HACCP reports. In particular, in large-scale places, the case where managers draw up false reports, without precisely observing preset rules, may frequently occur.

Further, conventional management of kitchen appliances has been performed by focusing on only temperature and humidity, and, recently, the management of pH, water activity, etc., has been conducted, but the management of odor sensors, capable of determining whether decay has occurred, is not still conducted everywhere.

Further, there frequently occurs the case where, when problems occur in kitchen appliances or food warehouses in the absence of managers, prompt measures are not taken, so that the status of food sanitation is deteriorated, and food may need to be discarded in large quantities or may be cooked in a bad state, thus threatening the health of people eating the food.

Further, in a conventional sanitation system, there is an attempt to collect environmental information and realize automation by applying various types of sensor equipment to specific places through a wired or wireless Local Area Network (LAN).

However, there are problems in that, when trouble occurs in the system using a wired LAN, excessive costs and time are required from the standpoint of maintenance, and in that, when trouble occurs in the system using a wireless LAN, the mobility of a terminal cannot be provided, and thus it is impossible or limitedly possible to connect to the wireless LAN during the movement of a manager. Further, there are problems in that, since the wired and wireless LANs are operated using a commercial communication network, communication costs are incurred, and in that, since wired and wireless LAN equipment is expensive, excessive installation costs thereof are incurred.

In addition, a manager processes inspection and inventory management when food items are delivered, and such processing must be manually conducted. Since it is impossible to individually ascertain the expiration dates and storage methods of respective food items, there is a high possibility of erroneously applying storage methods to respective food items. Further, when inventory management is performed by manually and individually ascertaining the expiration dates of food items, expiration dates may elapse and thus corresponding food items may be discarded if inexact expiration date information is written or if the writing thereof is omitted.

Accordingly, in order to solve the problems of the conventional sanitation system, the need to apply a further improved access method, capable of efficiently managing the sanitation of kitchen appliances, precisely managing food and solving the problems of the wired/wireless network occurring in the conventional system, to a sanitation system has increased.

DISCLOSURE

Technical Problem

Accordingly, the present invention has been made keeping in mind the above problems occurring in the prior art; and an object of the present invention is to provide a system and method that automatically manage incoming and outgoing food in real time, monitor the status of kitchen appliances in real time, analyze data, and store the analyzed data in management servers, using a remote server, management servers located in respective places, and a ubiquitous sensor network, and that always maintain environmental conditions in an optimal state by collecting real-time environmental information (temperature, humidity, etc.) using a sensor node installed at a specific location, and enable HACCP reports, which would otherwise be manually written by a manager, to be automatically drawn up.

Another object of the present invention is to provide a system and method that enable networks located in respective places to be operated through a ubiquitous sensor network, without being interrupted, even if trouble occurs in a commercial network.

A further object of the present invention is to provide a system and method that use a ubiquitous sensor network, so that a network disconnection problem and a mobility problem, which may occur when respective kitchen appliances and inspection devices are constructed through a wired or wireless LAN, can be solved.

That is, the ubiquitous sensor network is characterized in that a network is automatically formed, and a communication network is configured by automatically allocating an IP address (IPv4 or IPv6) even if a sensor node is added or deleted. Further, since the whole networks are realized in a wireless manner, kitchen appliances can be freely moved. At the time of inspecting food, mobility can be provided to the terminal used by a manager, and thus the inspection of food is possible in any place.

In addition, in the ubiquitous sensor network used in the present invention, an unique address of sensor node can be automatically allocated to a sensor node on the basis of an IP (IPv4 or IPv6), so that it is possible to monitor and control various types of kitchen appliances or food warehouses, each equipped with a sensor node, from a remote place, through the Internet or a mobile communication network.

Yet another object of the present invention is to provide a system and method, which automatically monitor specific information, such as the expiration date, storage method, and core temperature of food, inspected by a manager using an inspection terminal while transmitting the specific information to a management server and arranging the information in a database, so that a manager does not need to manually write the specific information, and in which sensor nodes attached to respective kitchen appliances collect real-time relevant information and transmit the collected information to a management server while providing the collected information to the manager, so that information related to HACCP is objectively acquired, thus guaranteeing legal reliability by prohibiting a user from arbitrarily forging data.

Still another object of the present invention is to provide a system and method in which communication charges can be reduced because only a minimum of required commercial network, for which certain charges must be paid, is used, in which sensor nodes can be attached to or detached from all kitchen appliances because the sensor nodes can be produced at low cost, and in which data collection and storage are possible and stored data can be subsequently transmitted both to a management server and to a remote central server even in the occurrence of a power outage because sensor nodes can also use battery power.

Still another object of the present invention is to provide a system and method in which the system is always operating even in the absence of a manager, so that trouble can be automatically solved depending on preset scheduling when trouble occurs, and in which, in the case of an issue that must be handled by a manger, information about the occurrence location of trouble and the trouble itself is transmitted to the manager, so that the trouble can be solved in real time.

Technical Solution

In order to accomplish the above objects, the present invention provides a ubiquitous sensor network-based system for automatically managing food sanitation, comprising at least one sensor node configured to have an IP address and installed in a specific region, including at least time one kitchen appliance, the sensor node being configured to measure and store sensing information, including temperature, humidity, pH, and odor information, at preset periods, to compare measured values with preset values, to generate a warning message and transmit the warning message to at least one management server when the measured values deviate from a range of preset values, to receive a control command for the kitchen appliance from the management server, and to control the kitchen appliance; a sink node configured to relay between the sensor node and the management server and between the mobile terminal and the management server, thus storing various types of data transmitted to or received from the management server; a mobile terminal configured to have an IP address and to read food information using a RFID reader or a barcode reader, transmit the food information to the management server through the sink node, measure and store sensing information, including temperature, humidity, pH, and odor information, at preset periods, compare the measured values with preset values, generate a warning message and transmit the warning message to the management server when the measured values deviate from a range of preset values, and receive a control command for food from the management server; and the management server configured to determine whether the data received from the sensor node or the mobile terminal is a measured value of the kitchen appliance or food, or a warning message, and configured to generate a control command corresponding to the warning message, transmit the control command to the sensor node or the mobile terminal, notify a manager of an urgent situation and a location of the kitchen appliance, arrange the data received from the sensor node or the mobile terminal in a database, analyze/store the received data in a format of Hazard Analysis Critical Control Point (HACCP) on a basis of the database, and output the analyzed/stored data if it is determined that the received data is the warning message.

Advantageous Effects

According to the present invention, there are advantages in that management servers, installed in facilities for providing meals or food distribution companies, and a remote central server, configured to remotely manage the management servers, are separately provided, thus protecting stored data even if trouble occurs later in the management servers.

Further, according to the present invention, there are advantages in that, since a wired network is not used, the addition or deletion of equipment is facilitated, and sensor nodes can be conveniently installed in existing kitchen appliances, cooking tools, and inventory warehouses, in which environmental information measurement devices are not installed, thus realizing automation and remote control.

Further, according to the present invention, there are advantages in that, since reports are automatically drawn up by storing all measured data in management servers and analyzing the measured data for respective kitchen appliances, excessive work on the part of a manager can be reduced, and in that, since data recorded in real time for respective kitchen appliances, cooking tools or food warehouses, is analyzed, the current state of food can be detected anytime and anywhere.

Further, according to the present invention, there is an advantage in that a ubiquitous sensor network is internally used, except for a network connected to an external network, and thus a network can be economically and efficiently configured.

Furthermore, according to the present invention, there is an advantage in that a history management operation, which would otherwise be manually performed by a manager at the time of inspecting food, can be automatically processed using a mobile terminal, so that precise food information can be acquired at the time of inspecting food, thus enabling history information to be more rapidly and precisely recorded and managed.

BEST MODE

The above and other objects, features and other advantages of the present invention will be more clearly understood from the following detailed description taken in conjunction with the accompanying drawings. In the following description of the present invention, detailed descriptions may be omitted if it is determined that the detailed descriptions of related well-known functions and construction may make the gist of the present invention unclear.

Hereinafter, embodiments of the present invention will be described in detail with reference to the attached drawings.

A ubiquitous sensor network-based system S for automatically managing food sanitation according to an embodiment of the present invention will be described with reference to FIGS. 1 to 5.

Figure 1:
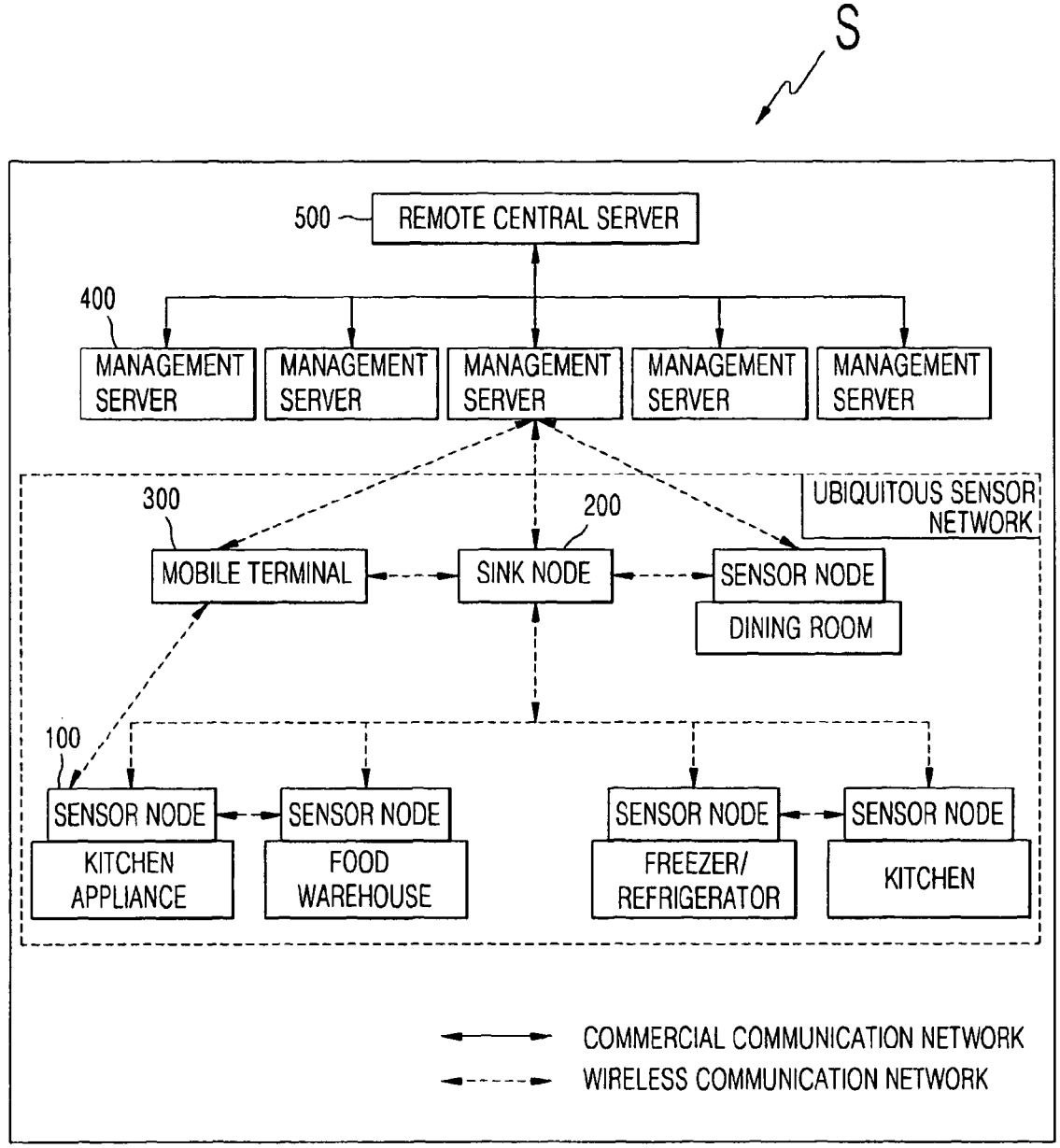
FIG. 1 is a diagram showing the schematic construction of a ubiquitous sensor network-based system for automatically managing food sanitation according to an embodiment of the present invention.

FIG. 1 is a diagram showing the schematic construction of a ubiquitous sensor network-based system S for automatically managing food sanitation according to an embodiment of the present invention. As shown in the drawing, the system S includes sensor nodes 100, a sink node 200, a mobile terminal 300, management servers 400, and a remote central server 500. A ubiquitous sensor network according to the present invention includes the sensor nodes 100, the sink node 200 and the mobile terminal 300. The sink node 200 functions to mediate between the sensor nodes 100 and the management servers 400 and between the mobile terminal 300 and the management servers 400. Data transmission/reception between the sensor nodes 100 and the management servers 400 and data transmission/reception between the mobile terminal 300 and the management servers 400 are performed through the sink node 200.

Figure 2:
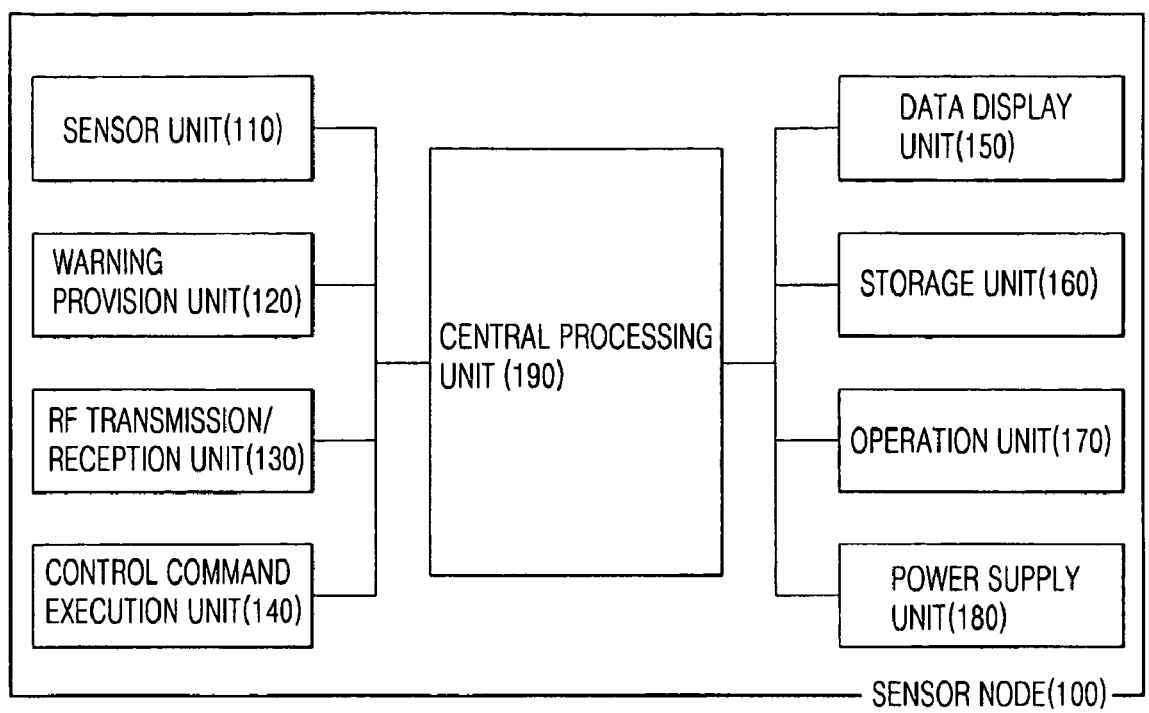
FIG. 2 is a diagram showing the detailed construction of a sensor node according to an embodiment of the present invention.

FIG. 2 is a diagram showing the detailed construction of the sensor nodes 100 according to an embodiment of the present invention. The sensor nodes 100 have their own IP address values and are installed in specific regions, such as a kitchen appliance, a kitchen, and a food warehouse. Each of the sensor nodes 100 functions to measure and store 'sensing information', including temperature, humidity, pH and odor information, at preset periods, transmit the sensing information to a management server 400 through the sink node 200, compare measured values with preset values, generate and display a warning message when the measured values deviate from the range of the preset values, transmit the warning message to the management server 400 through the sink node 200, receive a control command for the kitchen appliance from the management server 400, and control the kitchen appliance. The sensor node 100 includes a sensor unit 110, a warning provision unit 120, a Radio Frequency (RF) transmission/reception unit 130, a control command execution unit 140, a data display unit 150, a storage unit 160, an operation unit 170, a power supply unit 180, and a central processing unit 190.

In detail, the sensor unit 110 is installed inside and outside the sensor node 100 and is configured to measure sensing information, including temperature, humidity, pH, and odor information. The sensor unit 110 can be variously implemented using temperature and humidity sensors, a pH measurement sensor, and an odor sensor.

The warning provision unit 120 compares preset values with measured values, obtained by the sensor unit 110, and generates a corresponding warning message and provides a warning sound when the measured values deviate from the range of preset values. Here, the warning message includes the IP address value of a corresponding sensor node 100, a measurement error, and the time of generation of the warning message, and is displayed through the data display unit 150.

The RF transmission/reception unit 130 transmits or receives various types of data, including the values measured by the sensor unit 110 of the kitchen appliance, a warning message, and a control command, to or from the management server 400 through the sink node 200, and transmits or receives data to or from sensor nodes installed in other kitchen appliances. Further, when transmission or reception is impossible through single-hop communication, a sensor node 100 adjacent to the sensor node in question functions as a relay node, and thus data is transmitted or received through multi-hop communication. Meanwhile, the RF transmission/ reception unit 130 can be directly transmitted to or received from the management server 400 without passing through the sink node 200.

The control command execution unit 140 controls the kitchen appliance in compliance with the control command received from the management server 400.

The data display unit 150 displays the status information of the sensor node 100, values measured by the sensor unit 110, and a warning message.

The storage unit 160 temporarily stores the measured values. In this case, the storage unit 160 stores data corresponding to a storage capacity by allocating data at preset periods, and deletes data in the sequence of the oldest data depending on First-In, First-Out (FIFO) scheduling when the stored data exceeds the storage capacity.

The operation unit 170 stores the Operating System (OS) of the sensor node 100, the operation program of the sensor unit, the transmission/reception program required for RF transmission/reception, a program required for the sensor node to be allocated an IP address by the sink node 200, and a control program for the kitchen appliance, and operates and manages the stored OS and programs.

The power supply unit 180 selects continuous power or battery power, and supplies the selected power to the sensor node.

The central processing unit 190 controls the sensor unit 110, the warning provision unit 120, the RF transmission/reception unit 130, the control command execution unit 140, the data display unit 150, the storage unit 160, the operation unit 170 and the power supply unit 180, and performs all operations required to control the kitchen appliance.

Figure 3:
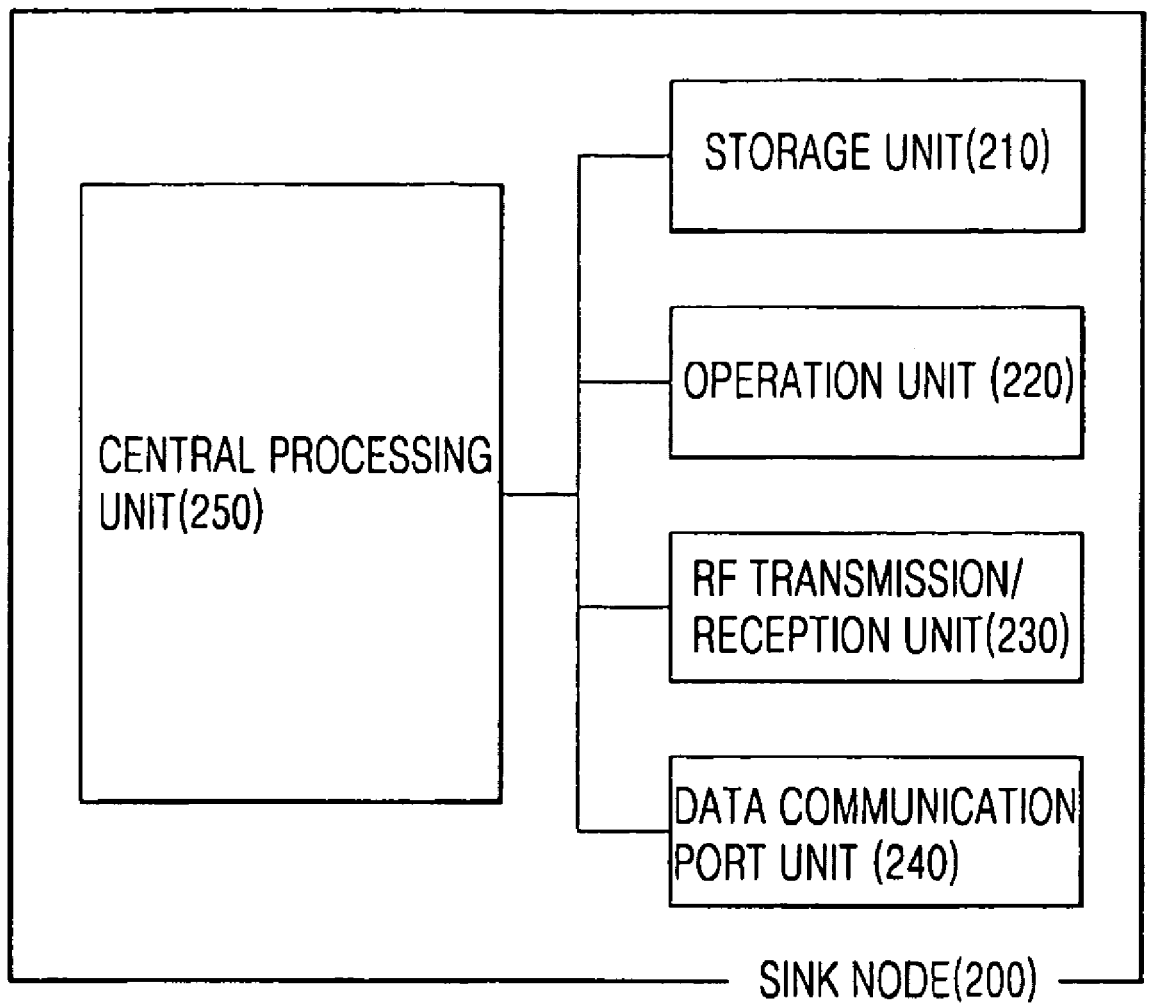
FIG. 3 is a diagram showing the detailed construction of a sink node according to an embodiment of the present invention.

FIG. 3 is a diagram showing the detailed construction of the sink node 200 according to an embodiment of the present invention. In the drawing, the sink node 200 functions to relay between the sensor nodes 100 and the management servers 400 and between the mobile terminal 300 and the management servers 400, and to allocate IP addresses (IPv4 or IPv6) both to the sensor nodes 100 and to the mobile terminal 300, thus temporarily storing various types of data transmitted to or received from the management servers 400. The sink node 200 includes a storage unit 210 for temporarily storing various types of data transmitted to or received from the sensor nodes 100 and the mobile terminal 300, an operation unit 220 for storing the OS of the sink node 200, a transmission/reception program for data transmission/reception, and a program required to allocate the IP addresses of the sensor nodes 100 and the mobile terminal 300, and operating and managing the stored OS and programs, an RF transmission/reception unit 230 for transmitting or receiving data to or from the sensor nodes 100 and the mobile terminal 300, a data communication port unit 240 for transmitting or receiving data to or from the management servers 400, and a central processing unit 250 for controlling the storage unit 210, the operation unit 220, the RF transmission/reception unit 230, and the data communication port unit 240, thus performing all operations related thereto.

Figure 4:
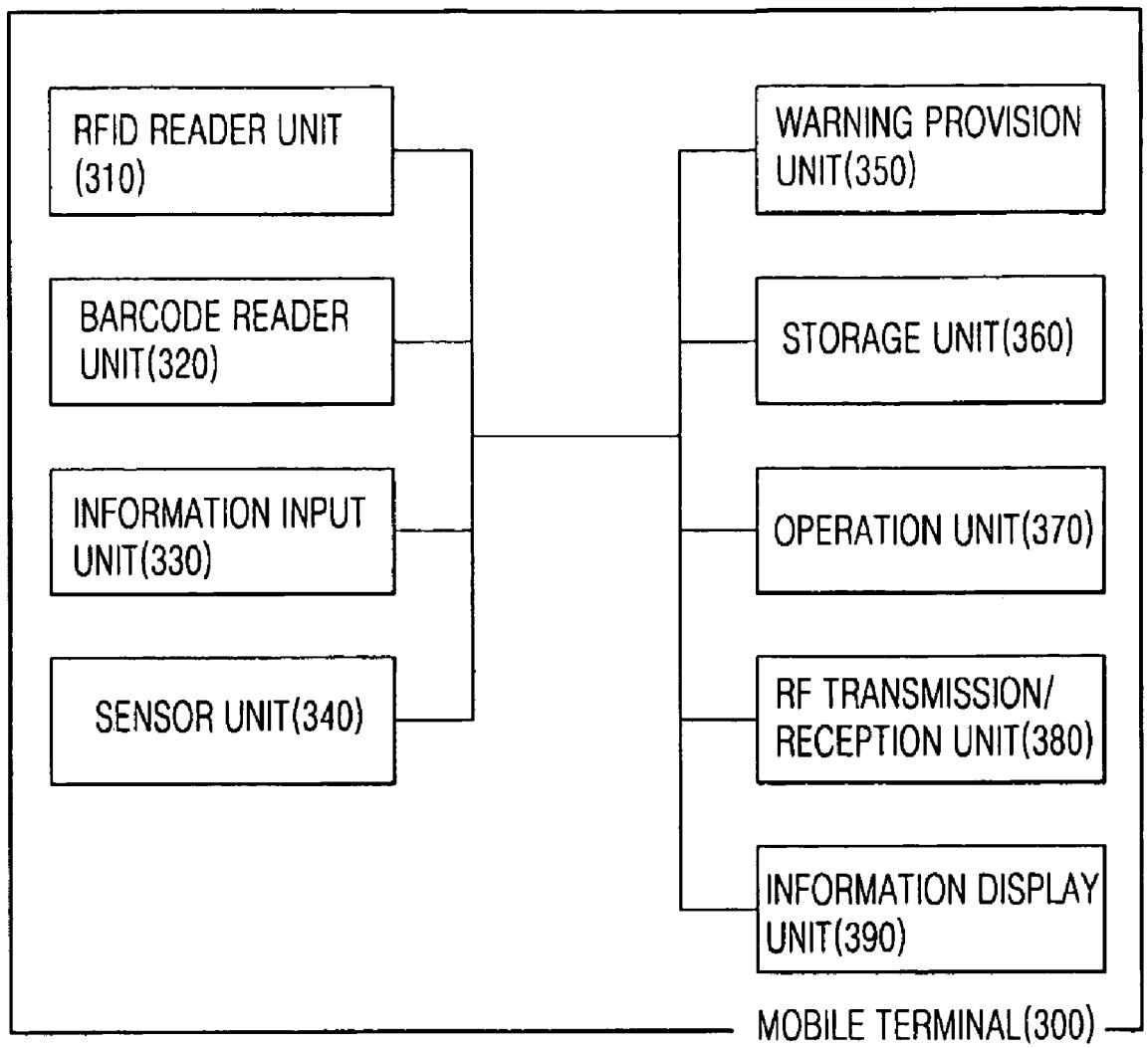
FIG. 4 is a diagram showing the detailed construction of a mobile terminal according to an embodiment of the present invention.

FIG. 4 is a diagram showing the detailed construction of the mobile terminal 300 according to an embodiment of the present invention. The mobile terminal 300 has its own IP address value and functions to read information of food using a Radio Frequency Identification (RFID) reader or a barcode reader at the time of inspecting food, transmit the read food information to a corresponding management server 400 through the sink node 200, measure and store sensing information, including temperature, humidity, pH, and odor information, at preset periods, compare measured values with preset values, generate a warning message and transmit the warning message to the management server 400 when the measured values deviate from the range of the preset values, and receive a control command for food from the management server 400. The mobile terminal 300 includes a RFID reader unit 310, a barcode reader unit 320, an information input unit 330, a sensor unit 340, a warning provision unit 350, a storage unit 360, an operation unit 370, a RF transmission/reception unit 380, and an information display unit 390.

In detail, the RFID reader unit 310 read food information from a RFID tag attached to food, and the barcode reader unit 320 reads food information from a barcode attached to food. Here, the food information read by the RFID reader unit 310 or the barcode reader unit 320 includes the expiration date, the production company and the production date of food.

The information input unit 330 allows additional food information, such as the preserved state, preservation method, incoming/outgoing information and inventory information of the food, to be recorded, in addition to the information automatically read by the RFID reader unit 310 or the barcode reader unit 320.

The sensor unit 340 measures sensing information, including the temperature, humidity, pH, and odor information of the food, at the time of inspecting food, and can be variously implemented using temperature and humidity sensors, a pH measurement sensor, an odor sensor, etc.

The warning provision unit 350 compares preset values with the values measured by the sensor unit 340, and generates a corresponding warning message and provides a warning sound when the measured values deviate from the range of the preset values. In this case, the warning message includes the IP address value of each mobile terminal 300, a measurement error, and the time of generation of the warning message, and is displayed through the information display unit 390.

The storage unit 360 temporarily stores the values measured by the sensor unit 340.

The operation unit 370 stores the OS of the mobile terminal 300, programs required to control the RFID reader unit and the barcode reader unit, an information input program required to record additional food information, a program required to drive the sensor unit 340, a transmission/reception program required for data transmission/reception, and a program required for the mobile terminal to be allocated an IP address by the sink node 200, and operates and manages the OS and the programs.

The RF transmission/reception unit 380 transmits or receives food information, including the values measured by the sensor unit 340, a warning message, etc., to or from the sink node 200 in a wireless manner. In this case, the RF transmission/reception unit 380 can directly transmit or receive information to or from the management server 400 without passing through the sink node 200. As shown in FIG. 1, the RF transmission/reception unit 380 can also transmit or receive information to or from an adjacent sensor node 100 when communication with the sink node 200 and the management server 400 is impossible.

The information display unit 390 displays the status information of the mobile terminal 300, food information, including data transmitted to or received from the management server 400 or the sink node 200, and all information measured by the sensor unit 340.

Figure 5:
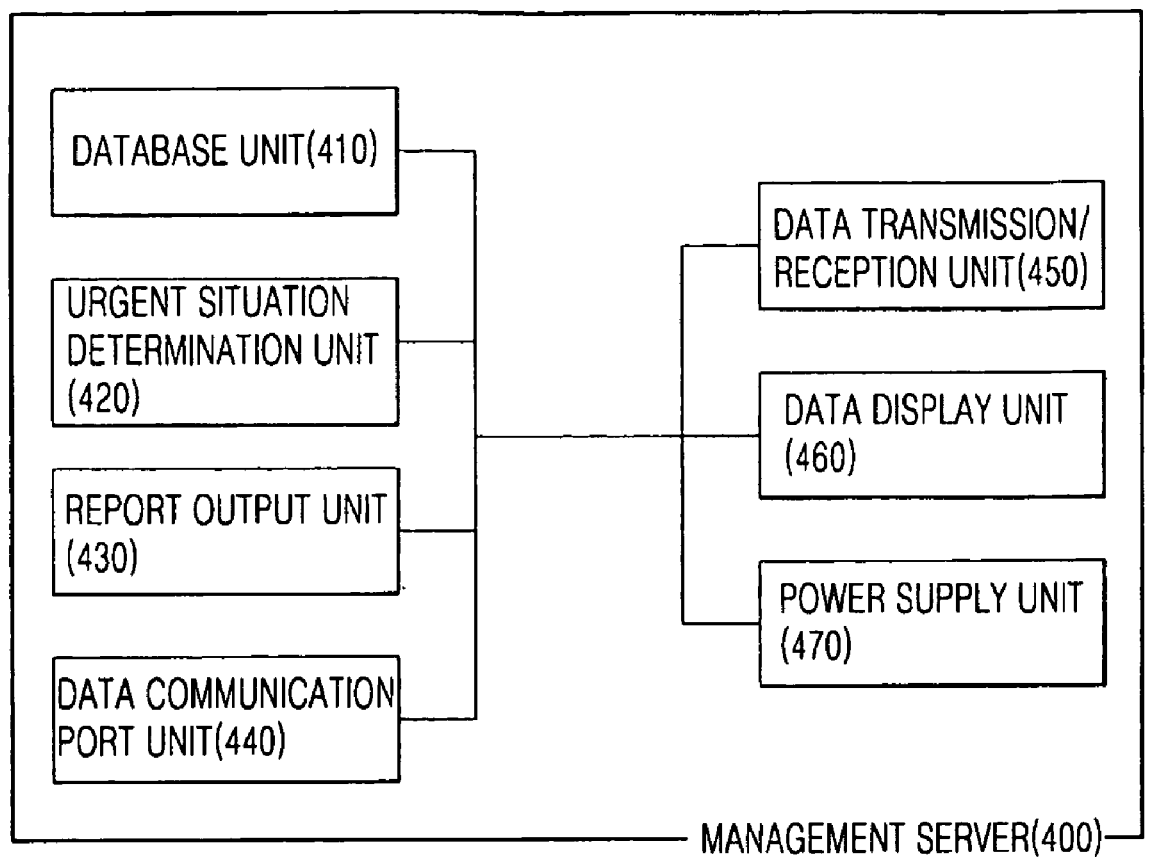
FIG. 5 is a diagram showing the detailed construction of a management server according to an embodiment of the present invention.

FIG. 5 is a diagram showing the detailed construction of the management servers 400 according to an embodiment of the present invention. Each of the management servers 400 determines whether data received from the sensor nodes 100 or the mobile terminal 300 through the sink node 200 is one of various measurement values of a kitchen appliance or food, or a warning message, generates a control command corresponding thereto, transmits the control command to the sensor nodes 100 or to the mobile terminal 300 and notifies the manager of the management server of an urgent situation and the location of the kitchen appliance if it is determined that the data is a warning message. Further, the management server 400 functions to arrange the data received from the sensor nodes 100 or the mobile terminal 300 in a database, analyze/store the data in the format of HACCP on the basis of the database, output resulting data, and transmit or receive various types of data, which are transmitted to or received from the sensor nodes 100 or the mobile terminal 300, to the remote central server 500 at regular periods preset to improve the safety and redundancy of data. The management server 400 includes a database unit 410, an urgent situation determination unit 420, a report output unit 430, a data communication port unit 440, a data transmission/reception unit 450, a data display unit 460, and a power supply unit 470.

In detail, the database unit 410 arranges the data received from the sensor nodes 100 and the mobile terminal 300 in a database, and analyzes/stores the data in the format of HACCP on the basis of the database.

The urgent situation determination unit 420 determines whether the data received from the sensor nodes 100 or the mobile terminal 300 is a measured value or a warning message. If it is determined that the received data is a warning message, the urgent situation determination unit 420 generates a control command corresponding thereto and transmits the control command to the sensor nodes 100 or the mobile terminal 300, and notifies the manager of the warning message pertaining to an urgent situation, the location of a kitchen appliance, etc.

The report output unit 430 outputs the data stored in the database unit 410 in the form of an HACCP report.

The data communication port unit 440 transmits or receives data and various types of signals to or from the ubiquitous sensor network, including the sensor nodes 100, the sink node 200, and the mobile terminal 300, and may include serial and parallel ports, a Universal Asynchronous Receiver-Transmitter (UART), an Ethernet port, a Universal Serial Bus (USB), etc.

The data transmission/reception unit 450 transmits or receives data to or from the remote central server 500 at regular periods preset for the safety and redundancy of various types of data.

The data display unit 460 displays real-time data that is transmitted to or received from the sensor nodes 100, the sink node 200, and the mobile terminal 300, and displays the real-time status information of the database unit 410, the urgent situation determination unit 420, the report output unit 430, and the data transmission/reception unit 450.

The power supply unit 470 uses an Uninterruptible Power Supply (UPS) as a power supply in preparation for the case where the management server does not operate during a power outage.

Further, the remote central server 500 receives various types of data, transmitted to or received from the sensor nodes 100 or the mobile terminal 300, from the management server 400 at preset periods.

If, on the basis of the data received from the management server 400, the received data is compared with allowable reference values defined in HACCP rules, and is found not to comply with the allowable reference values, the remote central server 500 notifies the manager of the remote central server of an urgent situation by providing a warning, and remotely controls the kitchen appliance through the management server 400 or directly controls the kitchen appliance using the IP address allocated to a corresponding sensor node 100.

A method of automatically managing food sanitation using the above-described ubiquitous sensor network-based system S for automatically managing food sanitation will be described below with reference to FIGS. 6 and 7.

Figure 6:
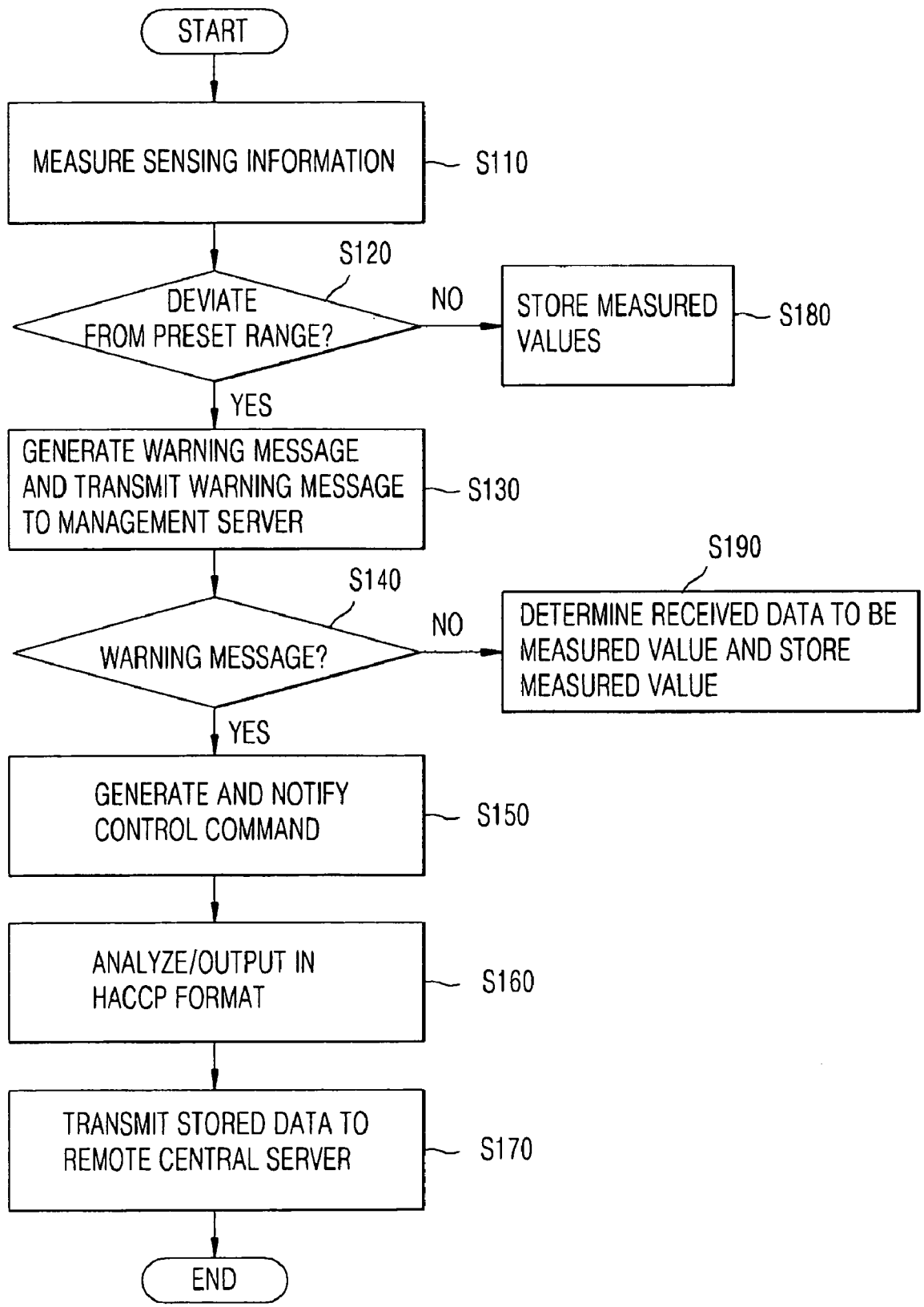
FIG. 6 is a flowchart showing a method of managing kitchen appliances using a sensor node according to an embodiment of the present invention.

FIG. 6 is a flowchart showing a method of managing kitchen appliances using a sensor node 100 according to an embodiment of the present invention. As shown in the drawing, the sensor unit 110 of the sensor node 100 is installed in a specific region, such as a kitchen appliance, a kitchen or a dining room, and is configured to measure sensing information, including temperature, humidity, pH, and odor information, at step S110. The warning provision unit 120 compares values measured by the sensor unit 110 with preset values, thus determining whether the measured values deviate from the range of preset values at step S120.

If it is determined at step S120 that the measured values deviate from the range of preset values, the warning provision unit 120 generates a warning message and provides a warning sound, and the RF transmission/reception unit 130 transmits the generated warning message to the management server 400, either through the sink node 200 or directly, at step S130.

The urgent situation determination unit 420 of the management server 400 determines whether the data received from the sensor node 100 is a measured value or a warning message at step S140.

If it is determined at step S140 that the received data is a warning message, the urgent situation determination unit 420 generates a control command corresponding to the warning message, transmits the control command to the sensor node 100, and notifies the manager of the management server of a warning message pertaining to an urgent situation, the location of the kitchen appliance, etc. at step S150. The database unit 410 analyzes and stores the warning message in the format of HACCP, and the report output unit 430 outputs the data stored in the database unit 410 in the format of a HACCP report at step S160.

Thereafter, the data transmission/reception unit 450 of the management server 400 transmits the data stored in the database unit 410 to the remote central server 500 at preset periods at step S170. That is, the warning message or the data stored in the management server 400 is transmitted to the remote central server 500, as well as the management server 400, to be prepared for the case where a problem occurs in either one of the management server 400 and the remote central server 500.

Meanwhile, if it is determined at step S120 that the measured values do not deviate from the range of preset values, the measured values obtained through the sensor unit 110 are stored in the storage unit 160 at step S180. Further, if it is determined at step S140 that the received data is not a warning message, the data received from the sensor node 100 is determined to be the measured value of the kitchen appliance or the like and is then stored in the database unit 410 at step S190.

Figure 7:
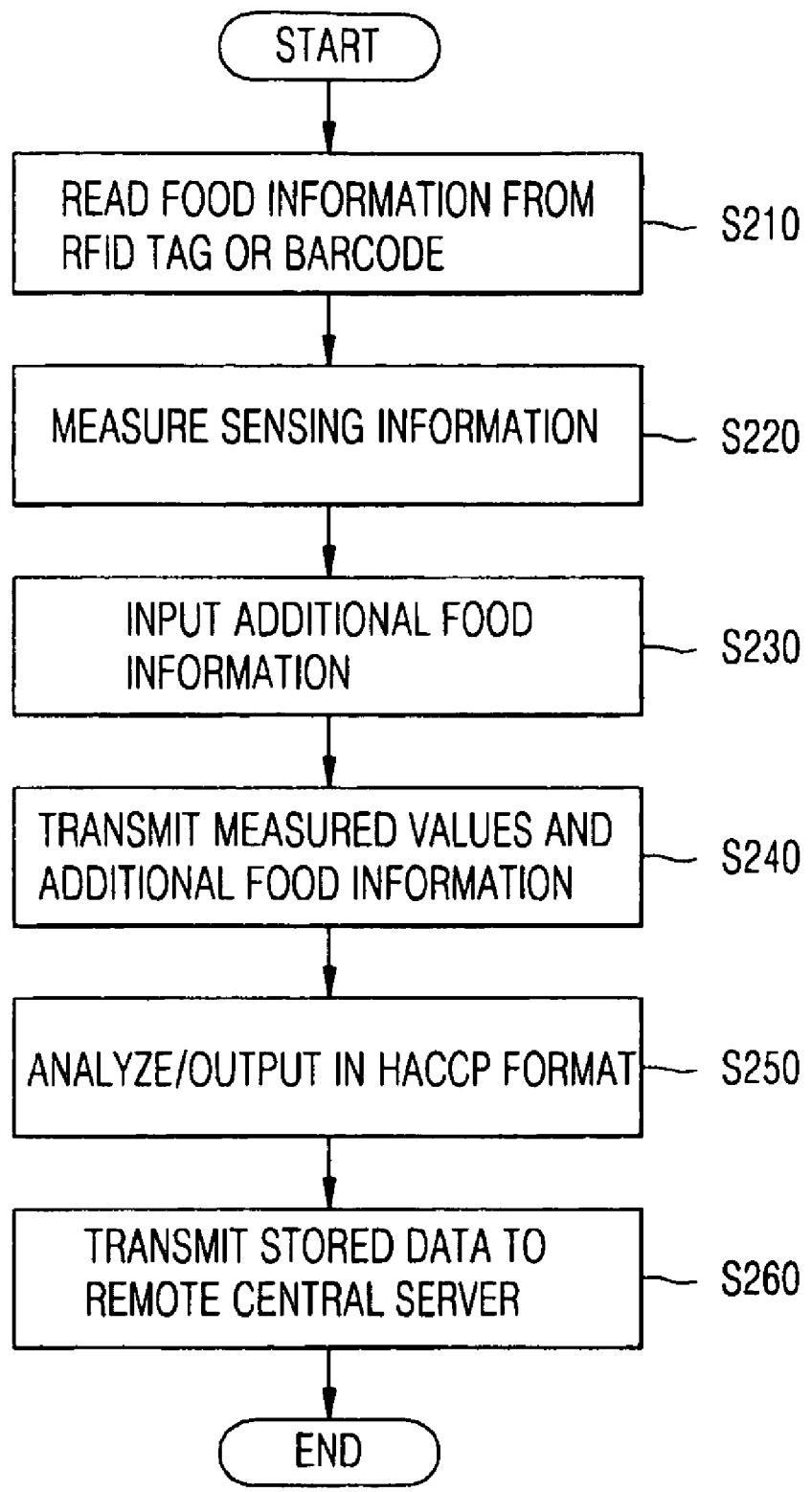
FIG. 7 is a flowchart showing a method of managing food using a mobile terminal according to an embodiment of the present invention.

FIG. 7 is a flowchart showing a method of managing food using the mobile terminal 300 according to an embodiment of the present invention. As shown in the drawing, the mobile terminal 300 reads food information from a RFID tag attached to the food using the RFID reader unit 310, or from a barcode attached to the food using the barcode reader unit 320 at step S210. The sensor unit 340 measures sensing information, including the temperature, humidity, pH, and odor information of food, at step S220.

The information input unit 330 receives additional food information, such as the preserved state, preservation method, incoming/outgoing information, and inventory information of food, in addition to the information automatically read by the RFID reader unit 310 or the barcode reader unit 320, at step S230.

The RF transmission/reception unit 380 transmits the measured values of the food and the additional food information to the management server 400, either through the sink node 200 or directly, at step S240.

The database unit 410 of the management server 400 analyzes and stores the measured values and the additional food information, which are received from the mobile terminal 300, in the format of HACCP, and the report output unit 430 outputs the data stored in the database unit 410 in the format of a HACCP report at step S250.

Thereafter, the transmission unit/reception unit 450 of the management server 400 transmits the data stored in the database unit 410 to the remote central server 500 at preset periods at step S260.

INDUSTRIAL APPLICABILITY

As described above, the present invention provides a ubiquitous sensor network-based system and method for automatically managing food sanitation, which are advantages in that management servers, installed in facilities for providing meals or food distribution companies, and a remote central server, configured to remotely manage the management servers, are separately provided, thus protecting stored data even if trouble occurs later in the management servers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Therefore, it should be noted that all suitable changes, modifications and equivalents thereof belong within the scope of the present invention.

The invention claimed is:

1. A ubiquitous sensor network-based system for automatically managing food sanitation, comprising:
    at least one sensor node configured to have an IP address and installed in a specific region, including at least one kitchen appliance, the sensor node being configured to measure and store sensing information, including temperature, humidity, pH, and odor information, at preset periods, to compare measured values with preset values, to generate a warning message and transmit the warning message to at least one management server when the measured values deviate from a range of preset values, to receive a control command for the kitchen appliance from the management server, and to control the kitchen appliance;
    a sink node configured to relay between the sensor node and the management server and between the mobile terminal and the management server, thus storing data transmitted to or received from the management server;
    a mobile terminal configured to have an IP address and to read food information using a RFID reader or a barcode reader, transmit the food information to the management server through the sink node, measure and store sensing information, including temperature, humidity, pH, and odor information, at preset periods, compare the measured values with preset values, generate a warning message and transmit the warning message to the management server when the measured values deviate from a range of preset values, and receive a control command for food from the management server; and
    the management server configured to determine whether the data received from the sensor node or the mobile terminal is a measured value of the kitchen appliance or food, or a warning message, and configured to generate a control command corresponding to the warning message, transmit the control command to the sensor node or the mobile terminal, notify a manager of an urgent situation and a location of the kitchen appliance, arrange the data received from the sensor node or the mobile terminal in a database, analyze/store the received data in a format of Hazard Analysis Critical Control Point (HACCP) on a basis of the database, and output the analyzed/stored data if it is determined that the received data is the warning message.

2. The Ubiquitous sensor network-based system according to claim 1, wherein the sink node allocates an IP address both to the sensor node and to the mobile terminal.

3. The ubiquitous sensor network-based system according to claim 1, further comprising a remote central server for receiving data, transmitted or received by the management server to or from the sensor node and the mobile terminal, at preset periods.

4. The ubiquitous sensor network-based system according to claim 3, wherein the remote central server is configured such that, when the data received from the management server is compared with allowable reference values defined in HACCP rules and does not comply with the reference values, the remote central server generates a warning, notifies a manager of the remote central server of the warning, and remotely controls the kitchen appliance through the management server, or directly controls the kitchen appliance using an IP address allocated to the sensor node.

5. The ubiquitous sensor network-based system according to claim 1, wherein the sensor node comprises:
    a sensor unit installed inside and outside the sensor node and configured to measure sensing information, including temperature, humidity, pH, and odor information;
    a warning provision unit configured to compare preset values with measured values, obtained by the sensor unit, and to generate a corresponding warning message and provide a warning sound when the measured values deviate from a range of preset values;
    a Radio Frequency (RF) transmission/reception unit configured to transmit or receive data, including values measured at the kitchen appliance by the sensor unit, a warning message, and a control command, to or from the management server through the sink node;
    a control command execution unit configured to control the kitchen appliance in compliance with the control command received from the management server;
    a data display unit configured to display status information of the sensor node, the values measured by the sensor unit, and the warning message;
    a storage unit configured to temporarily store the values measured by the sensor unit;
    an operation unit configured to store an operating system of the sensor node, an operation program of the sensor unit, a transmission/reception program for a RF transmission/reception, a program required for the sensor node to be allocated an IP address by the sink node, and a control program for the kitchen appliance, and operating and managing the operating system and the programs;
    a power supply unit configured to select continuous power or battery power and supply the selected power to the sensor node; and
    a central processing unit configured to control the sensor unit, the warning provision unit, the RF transmission/ reception unit, the control command execution unit, the data display unit, the storage unit, the operation unit, and the power supply unit, and to perform operations required to control the kitchen appliance.

6. The ubiquitous sensor network-based system according to claim 5, wherein the RF transmission/reception unit directly transmits or receives data, including the values measured at the kitchen appliance by the sensor unit, the warning message and the control command, to or from the management server, without passing through the sink node.

7. The ubiquitous sensor network-based system according to claim 5, wherein the warning message includes an IP address value of each sensor node, a measurement error, and a time of generation of the warning message.

8. The ubiquitous sensor network-based system according to claim 1, wherein the sink node comprises:
  a storage unit for temporarily storing data transmitted to or received from the sensor node and the mobile terminal;
  an operation unit for storing an operating system of the sink node, a transmission/reception program required for data transmission/reception, and a program required to allocate IP addresses of the sensor node and the mobile terminal, and operating and managing the operation system and the programs;
  a RF transmission/reception unit for transmitting or receiving data to or from the sensor node and the mobile terminal;
  a data communication port unit for transmitting or receiving data to or from the management server; and
  a central processing unit for controlling the storage unit, the operation unit, the RF transmission/reception unit, and the data communication port unit, thus performing operations related to control of the above units.

9. The ubiquitous sensor network-based system according to claim 1, wherein the mobile terminal comprises:
  a RFID reader unit for reading food information from a RFID tag attached to food;
  a barcode reader unit for reading food information from a barcode attached to food;
  an information input unit for recording additional food information, including a preserved state, a preservation method, incoming/outgoing information and inventory information of the food, in addition to information automatically read by the RFID reader unit or the barcode reader unit;
  a sensor unit for measuring sensing information, including temperature, humidity, pH, and odor information of food;
  a warning provision unit for comparing preset values with values measured by the sensor unit, and generating a corresponding warning message and providing a warning sound when the measured values deviate from a range of the preset values;
  a storage unit for temporarily storing the values measured by the sensor unit;
  an operation unit for storing an operating system of the mobile terminal, a program required to control the RFID reader unit and the barcode reader unit, an information input program required to record the additional food information, a program required to drive the sensor unit, a transmission/reception program required for data transmission/reception, and a program required for the mobile terminal to be allocated an IP address by the sink node, and operating and managing the operating system and the programs;
  a RF transmission/reception unit for transmitting or receiving food information, including the values measured by the sensor unit and a warning message, to or from the sink node in a wireless manner; and
  an information display unit for displaying status information of the mobile terminal, food information, including data transmitted to or received from the management server or the sink node, and all information measured by the sensor unit.

10. The ubiquitous sensor network-based system according to claim 9, wherein the RF transmission/reception unit directly transmits or receives the food information, including both the values measured by the sensor unit and the warning message, to or from the management server, without passing through the sink node.

11. The ubiquitous sensor network-based system according to claim 9, wherein the warning message includes an IP address value of each mobile terminal, a measurement error, and a time of generation of the warning message.

12. The ubiquitous sensor network-based system according to claim 9, wherein the food information read by the RFID reader unit or the barcode reader unit includes an expiration date, a production company, and a production date of food.

13. The ubiquitous sensor network-based system according to claim 1, wherein the management server comprises:
  a database unit for arranging the data received from the sensor node and the mobile terminal in a database, and analyzing/storing the data in a format of HACCP;
  an urgent situation determination unit for determining whether the data received from the sensor node or the mobile terminal is a measured value or a warning message, and generating a control command corresponding to the warning message, transmitting the control command to the sensor node or the mobile terminal, and notifying a manager of the warning message, including an urgent situation and a location of the kitchen appliance, if it is determined that the received data is a warning message;
  a report output unit for outputting the data stored in the database unit in a format of an HACCP report;
  a data communication port unit for transmitting or receiving data and various types of signals to or from a ubiquitous sensor network, including the sensor node, the sink node, and the mobile terminal; and
  a data transmission/reception unit for transmitting or receiving various types of data to or from the remote central server at preset periods.

14. The ubiquitous sensor network-based system according to claim 13, wherein the management server further comprises:
  a data display unit for displaying real-time data that is transmitted to or received from the sensor node, the sink node, and the mobile terminal, and displaying real-time status information of the database unit, the urgent situation determination unit, the report output unit, and the data transmission/reception unit; and
  a power supply unit for using an Uninterruptible Power Supply (UPS) as a power supply in preparation for a case where the management server does not operate during a power outage.

15. The ubiquitous sensor network-based system according to claim 5, wherein the RF transmission/reception unit transmits or receives data to or from sensor nodes installed in other kitchen appliances, and transmits or receives data through multi-hop communication by causing an adjacent sensor node to function as a mediator when transmission or reception is impossible through single-hop communication.

16. A ubiquitous sensor network-based method of automatically managing food sanitation in a method of managing kitchen appliances using a sensor node, comprising the steps of:
- (a) installing at least one sensor node in a specific region, such as a kitchen appliance, a kitchen or a dining room, and the sensor node measuring sensing information, including temperature, humidity, pH, and odor information;
- (b) comparing values measured by the sensor node with preset values, thus determining whether the measured values deviate from a range of the preset values;
- (c) if it is determined at step (b) that the measured values deviate from the range of the preset values, the sensor node generating a warning message, providing a warning sound, and transmitting the generated warning message to at least one management server, either through a sink node or directly;
- (d) the management server determining whether data received from the sensor node is a measured value or a warning message;
- (e) if it is determined at step (d) that the received data is a warning message, the management server generating a control command corresponding to the warning message, transmitting the control command to the sensor node, and notifying a manager of the management server of a warning message, including an urgent situation and a location of the kitchen appliance; and
- (f) the management server analyzing and storing the warning message in a format of Hazard Analysis Critical Control Point (HACCP) and outputting the warning message in a format of an HACCP report.

17. The ubiquitous sensor network-based method according to claim 16, further comprising, after step (f), the step of:
- (g) the management server transmitting stored data to a remote central server at preset periods.

18. The ubiquitous sensor network-based method according to claim 16, further comprising the step of:
- (h) if it is determined at step (b) that the measured values do not deviate from the range of the preset values, the sensor node storing the measured values of the kitchen appliance.

19. The ubiquitous sensor network-based method according to claim 16, further comprising the step of:
- (i) if it is determined at step (d) that the received data is not a warning message, the management server determining that the data received from the sensor node is a measured value of the kitchen appliance, and storing the measured value.

20. A ubiquitous sensor network-based method of automatically managing food sanitation in a method of managing food using a mobile terminal, comprising:
- (k) the mobile terminal reading food information from a Radio Frequency Identification (RFID) tag or a barcode attached to food;
- (l) the mobile terminal measuring sensing information, including temperature, humidity, pH, and odor information of the food;
- (m) the mobile terminal receiving additional food information, including a preserved state, a preservation method, incoming/outgoing information, and inventory information of the food;
- (n) the mobile terminal transmitting measured values of the food and the additional food information to the management server, either through a sink node or directly; and
- (o) the management server analyzing and storing the measured values and the additional food information, which are received from the mobile terminal, in a format of HACCP, and outputting the stored information in a format of an HACCP report.

21. The ubiquitous sensor network-based method according to claim 20, further comprising, after step (o), the step of:
- (p) the management server transmitting the stored data to a remote central server at preset periods.

\* \* \* \* \*